United States Patent [19]
Gassert

[11] Patent Number: 5,921,593
[45] Date of Patent: Jul. 13, 1999

[54] MOVABLE TENSION TIE AND LOCKING MECHANISM

[75] Inventor: Heinz Gassert, Seattle, Wash.

[73] Assignee: The Boeing Company, Seattle, Wash.

[21] Appl. No.: 08/924,003

[22] Filed: Aug. 29, 1997

[51] Int. Cl.[6] .................................................... B64C 1/00
[52] U.S. Cl. ........................................ 292/144; 244/118.2
[58] Field of Search ................................. 244/118.2, 119, 244/125, 137.4; 292/144, 44, 45, 48, 201, 51, 53, DIG. 5

[56] References Cited

U.S. PATENT DOCUMENTS

4,621,780  11/1986  Doyhamboure et al. .
4,989,809   2/1991  Arnold .
5,314,143   5/1994  Luria .

Primary Examiner—Steven Meyers
Assistant Examiner—Gary Estremsky
Attorney, Agent, or Firm—Christensen O'Connor Johnson & KindnessPLLC

[57] ABSTRACT

A movable tension tie assembly (10) for a fuselage of an airplane, includes a plurality of elongate struts (12a) and (12b) having a first end (16) and a second end (28) longitudinally spaced therefrom. The first end of each strut being swingingly connected to the interior of the fuselage for swinging movement of the struts between a retracted position, wherein the struts do not obstruct the interior of the fuselage, and an extended position, wherein the struts extend substantially across the diameter of the interior of the fuselage. The movable tension tie assembly also includes first and second lock assemblies (14a) and (14b) rigidly connected to the interior of the fuselage for locking engagement with the struts. The lock assemblies include a drive motor (17) operatively connected thereto for selectively actuating the locking assembly between a locked position wherein the struts are held in the extended position to limit deflections of the fuselage when the fuselage is pressurized and an unlocked position wherein the struts may be swung into the retracted position.

10 Claims, 5 Drawing Sheets

MOVABLE TENSION TIE AND LOCKING MECHANISM

FIELD OF THE INVENTION

The present invention relates to aircraft fuselage tension ties and, in particular, to movable tension ties for double lobe fuselages.

BACKGROUND OF THE INVENTION

As the demand for higher capacity transport aircraft increases, new and innovative fuselage designs accommodating increased capacity have caused the designers to reach into unconventional fuselage designs. One such design is a fuselage that has a double lobe cross section, wherein the cross section includes two conventional circular cross section fuselages that are laterally joined together. Although such a design permits a significant increase in either passenger or cargo capacity, or both, it is not without its problems.

A major problem associated with a fuselage having a double lobe cross section stems from the very geometry that gives it a significant advantage in capacity over fuselages having a circular cross section and the fact that the interior of the fuselage must be pressurized. Modem commercial aircraft often cruise at altitudes that exceed 30,000 feet above sea level. At these altitudes, as well as altitudes significantly lower, the oxygen content in the air is significantly less than that required to maintain the consciousness of the crew and passengers. Thus, either the passenger and crew compartments must be pressurized to simulate near sea level atmospheric conditions, or each and every person on board must be provided with an oxygen mask. Because the latter solution is not a reasonable or preferred alternative, the fuselage must be pressurized.

As is well-known in the art, vessels that are subjected to internal pressurization tend to naturally expand to a circular cross-sectional shape and, therefore, the optimum configuration for a pressurized vessel is circular. A pressurized vessel that is noncircular in cross section is subjected to significantly increased loads because of the tendency of the fuselage to expand to a circular cross section. In the case of a fuselage having a double lobe cross section, the unusually high loads occur at the crown and keel of the fuselage, that is, at the top and bottom of the fuselage where the two lobes are laterally joined together. The increased load at the crown and keel, if left unreacted, may cause the fuselage to pull apart at the crown and keel when the fuselage is pressurized. Thus, there exists a significant need for a structure stiffening assembly to prevent the fuselage from pulling apart.

In the past, the crown and/or keel beam structure, as well as the associated fuselage structure, would be stiffened or otherwise strengthened to react the increased loads. However, because of the unusually high loads associated with a double lobe fuselage, the amount of stiffening required to react these loads would result in an unreasonably heavy aircraft. Therefore, simply stiffening the keel and crown beams, as well as the associated fuselage structure, is not a reasonable option to react the loads associated with a fuselage having a double lobe cross section.

Utilizing a series of posts rigidly and permanently attached between the crown and keel beams to maintain the shape of the pressurized fuselage would obstruct the movement of cargo containers or pallets within the fuselage from one lobe into the other. Therefore, static posts disposed within the fuselage and spanning between the crown and keel of the fuselage are also an unsatisfactory solution to react the increased loads due to the double lobe shape of the fuselage.

Thus, there exists a need for a relatively simple and weight efficient assembly to react and transfer large loads resulting from the pressurization of the multiple lobes. The present invention addresses these and related issues to overcome the limitations currently encountered by fuselage strengthening mechanisms currently available in the art.

SUMMARY OF THE INVENTION

The present invention is a movable tension tie assembly for an internally pressurized pressure hull. The tension tie assembly includes a plurality of elongate struts having first and second ends spaced in the elongate direction. The first ends of each strut are swingingly connected to the crown of the pressure hull for swinging movement of the struts between a retracted position, where the struts do not obstruct the interior of the pressure hull, and an extended position, where the struts extend substantially across the diameter of the interior of the pressure hull. A locking assembly is connected to the interior of the pressure hull to lock the struts into the extended position. The movable tension tie assembly further includes an actuation mechanism that is operatively connected to the locking assembly to selectively actuate the locking assembly between a locked position, where the struts are held in the extended position, thereby limiting deflections of the pressure hull when the pressure hull is pressurized, and an unlocked position, where the struts may be swung into the retracted position.

In a further aspect of the invention, the movable tension tie assembly includes a plurality of centering latch members fixed to the interior of the pressure hull and positioned for engagement with the second ends of the struts when the struts are in the extended position. The second end of the struts defines a centering frame having first and second cams protruding outwardly from opposing sides of each strut and are positionable within the centering latch members to limit the deflections of the pressure hull.

In a further aspect of the invention, the movable tension tie assembly includes an electromechanical drive unit disposed adjacent to the first ends of the struts and operatively connected to the struts to actuate the struts between the retracted and extended positions.

In the preferred embodiment of the present invention, the movable tension tie assembly is longitudinally disposed in the interior of the fuselage, between ceiling structure and floor structure. The movable tension tie assembly of the present invention is mounted along the centerline of the width of the fuselage, opposing the cargo doors. As configured, the movable tension tie assembly of the present invention is swingable between the extended and retracted positions to conveniently allow cargo containers to be rolled in through the cargo doors, across the width of the fuselage, and then longitudinally along the length of the fuselage, thereby facilitating easy loading and unloading of the aircraft.

The movable tension tie assembly of the present invention has the advantage of providing a weight saving tension enhancing assembly to a noncircular pressure vessel without adding unreasonable amounts of material to conventional fuselage structure, such as the crown beam, keel beam, or frames. Additionally, the present invention's use of movable tension struts permits the tension enhancing structure to be swung into a retracted position, wherein cargo may be easily loaded and unloaded from within the fuselage. Thus, the present invention provides a relatively simple and weight-efficient assembly to react and transfer large loads resulting from pressurization of the interior of a fuselage having a double lobe cross section, without substantial interference with the loading and unloading of cargo within the fuselage.

BRIEF DESCRIPTION OF THE DRAWINGS

The foregoing aspects and many of the attendant advantages of this invention will become understood by reference to the following detailed description, when taken in conjunction with the accompanying drawings, wherein.

DETAILED DESCRIPTION OF THE PREFERRED EMBODIMENT

Figure 1:
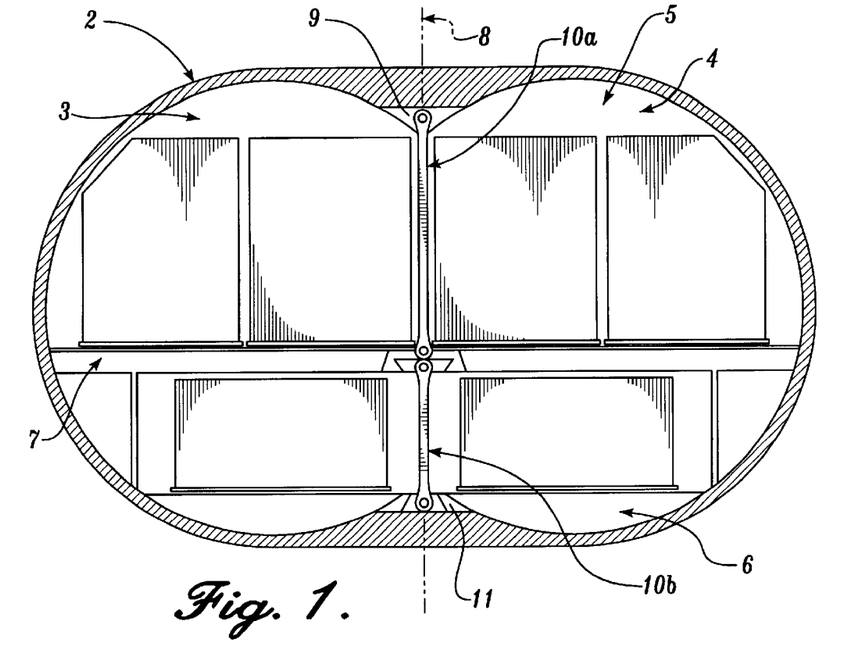
FIG. 1 is a cross-sectional view of a fuselage having a double lobe cross section with a movable tension tie assembly of the present invention shown in the extended and locked position.
Figure 2:
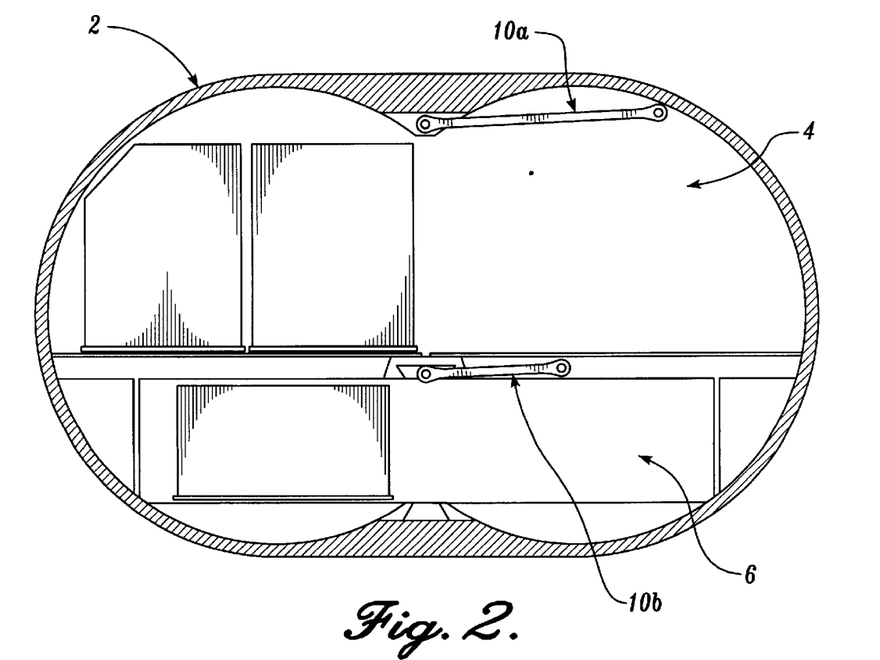
FIG. 2 is a cross-sectional view of a fuselage having a double lobe cross section with the movable tension tie assembly of the present invention shown in the retracted position.

Referring to FIG. 1 and FIG. 2, a dual lobe fuselage 2, sometimes referred to as a double bubbled fuselage has a left lobe 3 and a right lobe 5. The fuselage 2 is separated into a main cabin 4 and a cargo hold 6 by a central main cabin floor 7. Movable tension tie assemblies 10a and 10b are shown in both the extended (FIG. 1) and retracted (FIG. 2) positions. In the extended, operable position of FIG. 1, the upper tension tie assembly 10a spans the vertical distance between the crown 9 of the fuselage 2 and the main cabin cargo floor 7 at the plane of symmetry 8 defined by the longitudinal centerline of the width of the fuselage 2. Similarly, the lower tie assembly 10b spans the vertical distance between the main cabin floor 7 and the keel 11 of the fuselage 2. The tension tie assembly 10a is swingably attached to the crown beam (shown schematically) for swinging movement between the retracted position and the extended position. In the retracted position of FIG. 2, the tension tie assembly 10a is horizontally oriented and positioned near the ceiling of the main cabin so as not to obstruct the interior of the fuselage 2. In the extended position, the tension tie assembly 10a is vertically oriented and tied to the fuselage 2 so as to substantially limit deflections of the fuselage 2, as described in greater detail below. The lower tension tie assembly 10b is swingably attached to the main cabin floor 7 for swinging movement between retracted and extended positions as described above for the tension tie assembly 10a.

Although the tension tie assemblies 10a and 10b are illustrated in FIGS. 1 and 2 as spanning the vertical distance between an aircraft having an all cargo configuration, the present invention may also be utilized in aircraft having different configurations, such as one where the main cabin 4 is an all passenger configuration.

Figure 3:
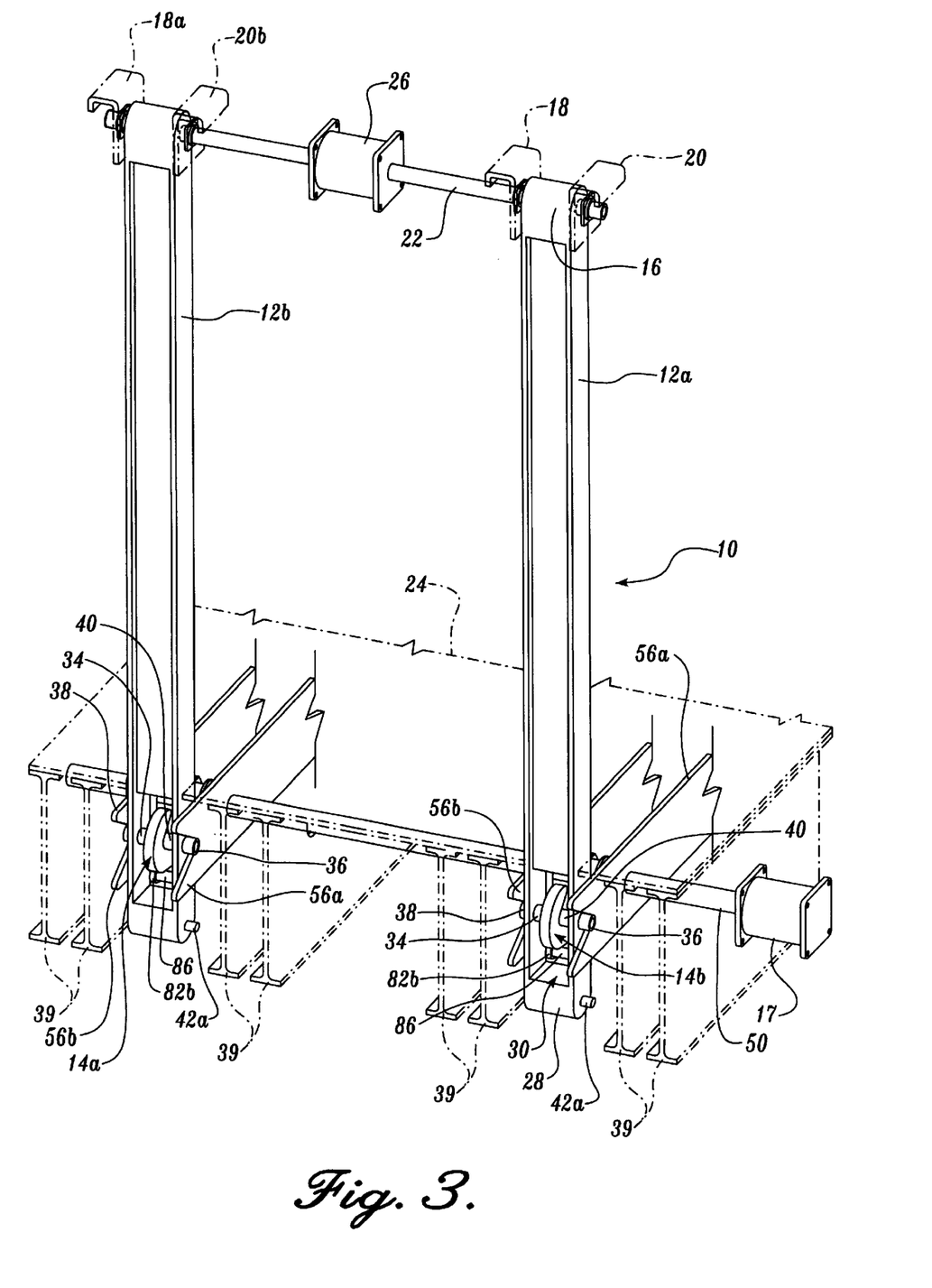
FIG. 3 is a perspective view of a movable tension tie assembly of the present invention with ceiling attachment structure and floor structure shown in phantom.

The preferred embodiment of the tension tie assembly 10 of FIG. 3 is shown in the extended and locked position as it would be deployed within the fuselage (not shown) of the airplane after cargo containers (not shown) have been loaded or unloaded. The tension tie assembly 10 includes elongate first and second tension struts 12a and 12b, first and second lock assemblies 14a and 14b, and a drive motor 17 to actuate the lock assemblies 14a and 14b between a locked and an unlocked position, to be described more fully below. Although the invention is described in connection with the use of two tension struts 12a and 12b, the invention is not so limited and more or fewer tension struts 12a and 12b may be used without departing from the scope of the invention. Furthermore, because the tension struts 12a and 12b and corresponding lock assemblies 14a and 14b are identical to each other in both configuration and operation, only one strut and lock assembly will be described.

Note that throughout this detailed description, reference numbers combined with letters indicate like components or similar components for all referenced items that include the same number, while possibly having a different letter. Thus, if "tension strut" is referred to simply as "tension strut 12," it may be considered as either the first tension strut 12a or the second tension strut 12b, or both.

The tension strut 12 has a first end 16 that is swingingly attached to first and second attachment brackets 18 and 20 (shown in phantom). Each attachment bracket 18 and 20 is configured as an inverted "J" and is suitably manufactured from a high strength material, such as steel. The arcuate ends of the attachment brackets 18 and 20 are rigidly fastened to frames of the fuselage, for example the crown beam or other suitable structure, by fasteners, such as bolts or other means well known in the art, extending vertically therethrough. The first and second attachment brackets 18 and 20 are spaced from each other such that the first end 16 of the tension strut 12 may be sandwiched therebetween. An elongated line shaft 22 is oriented normal to the elongate direction of the tension strut 12 and affixed thereto at the first (upper) end 16. The tension strut 12 is journaled to the attachment brackets 18 and 20 by the line shaft 22 on a pair of conventional shaft bearings. The tension strut 12 is preferably fastened to the line shaft 22 by a keyed joint, such as a spline joint, or other well-known serrated joints in the art, thereby permitting the tension strut 12 to selectively swing about the axis of rotation defined by the elongate line shaft 22. As thusly configured, the tension strut 12 may be swung between an extended position, wherein the tension strut 12 extends between the ceiling and the floor 24, and a retracted position, wherein the tension strut 12 is oriented horizontally adjacent the ceiling so as not to obstruct the interior of the fuselage. Although a keyed joint is the preferred method of attaching the tension strut 12 to the line shaft 22, other means of attachment, such as a flange, are also within the scope of the invention.

In the preferred embodiment of FIG. 3, the first and second attachment brackets 18 and 20 are rigidly attached to frames in the ceiling of the fuselage. However, the attachment brackets 18 and 20 may be mounted in other locations within the fuselage, such as to floor beams in an aircraft having a lower cabin for cargo or passengers. Thus, the orientation of the attachment brackets 18 and 20 and, therefore, the tension tie assembly 10, relative to the fuselage 2, may change without departing from the scope of the invention.

Another set of brackets 18a and 20a are spaced longitudinally along the fuselage from the first set of brackets 18 and 20. The line strut 22 is also journaled in brackets 18a and 18b by suitable bearings.

As seen in FIG. 3, a second tension strut 12b is coupled to the opposing end of the line shaft 22 on the brackets 18a and 20a in a manner described above. Thus, the first and second tension struts 12a and 12b may be cooperatively actuated by a single line shaft 22. A lift drive motor 26 is operatively disposed on the line shaft 22, by means well known in the art, to simultaneously rotate the line shaft 22, and thus the tension struts 12a and 12b, between the retracted and extended positions. Although it is preferable to use a single motor 26 to actuate two or more tension struts 12 between the retracted and extended positions, the invention is not so limited and more or fewer motors 26 may be utilized to actuate the tension struts 12. Thus, one motor 26 per tension strut 12 is within the scope of the invention, as well as using an appropriately sized motor to simultaneously drive two or more struts 12 to the desired position. Furthermore, although simultaneous actuation of the tension struts 12 between the retracted and extended positions is preferred, independent actuation of the tension struts 12 relative to each other is also within the scope of the invention. Although the preferred embodiment of the present invention utilizes a motor 26 to rotate the tension strut 12 between the retracted and extended positions, other electromechanical drive units, such as a hydraulically driven cylinder or an air actuated cylinder, are also within the scope of the present invention.

Still referring to FIG. 3, the tension strut 12 has a second (lower) end 28 spaced in the elongate direction from the first end 16. The second end 28 defines a rectangularly shaped opening 30 extending through the thickness of the tension strut 12; that is, the opening 30 extends normal to the elongate direction of the tension strut 12. The opening 30 is located near the terminal end of the tension strut 12. The second end 28 of this strut also includes a pair of coaxially aligned bores (not shown) defined orthogonal to and substantially midway along the elongate direction of the opening 30, that is, the bores are parallel to the line shaft 22 at the other end of the strut 12. The coaxially aligned bores are of a predetermined diameter and are capable of slidably receiving a cylindrical shaft 34. The shaft 34 bifurcates the rectangular opening 30. The shaft 34 is longer than the width of the tension strut 12 by a predetermined amount such that when the shaft 34 is coaxially received within the bores, the ends of the shaft 34 project outwardly from the sides of the tension strut 12 to define first and second centering cams 36 and 38. Although the rigid shaft extensions are the preferred structure for the first and second centering cams 36 and 38 because of ease of manufacturing, alternative cam members, such as rollers, are also within the scope of the present invention.

The central portion of the shaft 34 bisecting the opening 30 defines a hook pin 40 for hooking engagement with the lock assembly 14, to be described in greater detail below. The shaft 34 is fastened to the tension strut 12 by means well known in the art, such as a key plate (not shown). The second end 28 of the strut 12 also carries first and second secondary lock pins 42a and 42b located a predetermined distance below the centering cams 36 and 38. The lock pins 42a and 42b protrude outwardly from opposing sides of the tension strut 12 and can be used to prevent the inadvertent opening of the movable tension tie assembly 10, to be described more fully below. Although bifurcating the opening 30 with a shaft 34 is preferred because of ease of manufacturing, other methods, such as integrally formed members, may be used to manufacture the hook pin 40.

The second end 28 of the tension strut 12 extends through an opening (not shown) in the floor 24. The opening in the floor 24 is of predetermined dimensions to permit the tension strut 12 to swing unimpededly therethrough. As seen in FIG. 3, the lock assembly 14 is statically attached to a plurality of elongate floor beams 39 (shown in phantom) that span the cross section of the fuselage. By statically attaching the lock assembly 14 to the floor beams 39 and the attachment brackets 18 and 20 to the ceiling, and by locking the tension strut 12 to the lock assembly 14, the tension strut 12 limits the outward deflection of the fuselage when the fuselage is pressurized.

Figure 4:
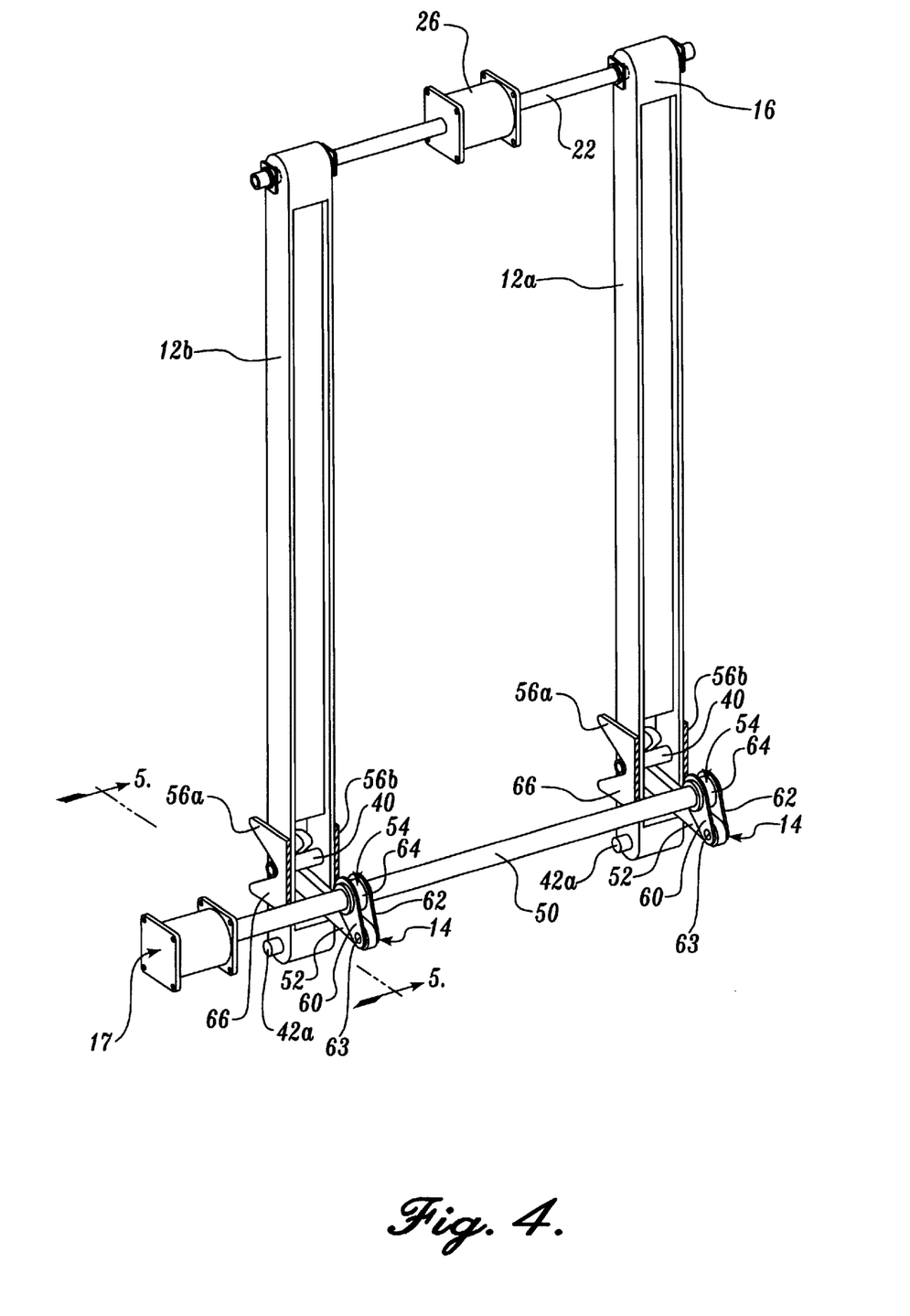
FIG. 4 is a forward looking view of a movable tension tie assembly of the present invention shown in the extended and locked position with attachment structure removed for clarity.

Now referring to FIGS. 3 and 4, the lock assembly 14 includes a drive shaft 50, a pull-in hook 52, a hook crank arm 54, and first and second centering plates 56a and 56b. The drive shaft 50 is rotatably mounted on a plurality of shaft bearings (not shown) that are in turn mounted to the floor beams 39 in a manner that is well known in the art. The drive shaft 50 is disposed normal to the elongate direction of the floor beams 39 and parallel to the hook pin 40. The drive shaft 50 is positioned behind the tension strut 12, such that the tension strut 12 may freely swing between the retracted and the extended positions without being impeded by the drive shaft 50.

As may be better seen in FIG. 4, the crank arm 54 has first and second flanges 60 and 62 held in spaced parallel disposition by a collar 64. The collar 64 is rigidly attached to the flanges 60 and 62 and the crank arm 54 by means well known in the art, such as a key plate or threads. The distal ends of each flange 60 and 62 carry bores that are coaxially aligned so that a pin 63 may be inserted therethrough. The axis of the bores and pin are parallel to the drive shaft 50. As thusly attached to the drive shaft 50, the crank arm 54 is selectively rotatable about an axis defined by the elongate direction of the drive shaft 50.

As seen in FIGS. 3 and 4, the pull-in hook 52 is configured as an elongate "J" having an arcuate first end 51 and a second end 53 carrying a bore extending through the thickness thereof. The elongate direction of the pull-in hook 52 is aligned normal to the elongate direction of the drive shaft 50 with the concave portion of the arcuate first end 51 facing substantially upward for hooking engagement with the hook pin 40 of the tension strut 12. The second end 53 of the pull-in hook 52 is pivotally pinned between the distal portion of the crank arm 54 by the pin 63 inserted into the coaxially aligned bores of the pull-in hook 52 and the tapered ends of the flanges 60 and 62 of the crank arm 54. The concave portion of the pull-in hook 52 is curved at a predetermined radius of curvature such that when the pull-in hook 52 engages the hook pin 40, the hook pin 40 is securely grasped by the pull-in hook 52, thereby locking the tension strut 12 into position in the centering plate 56.

The centering plate 56 is substantially rectangular in shape and includes a forked first end 66. The centering plate 56 extends normal to the elongate direction of the drive shaft 50 when the centering plate 56 is mounted to the floor beams 39 as described below. The open portion of the forked end 66 faces away from the drive shaft 50 and toward the axis defined by the elongate direction of the hook pin 40 and centering cams 36 and 38, such that it is capable of receiving the first and second centering cams 36 and 38 of the tension strut 12. The second end (not shown) of the centering plate 56 is rigidly attached to the floor beams 39 by a plurality of conventional fasteners. The centering plate 56 is suitably manufactured from a high strength material, such as steel, with hardened surfaces to minimize wear thereon caused by repeated engagement with the tension struts 12. The second centering plate 56b is configured identically to the first centering plate 56a and, therefore, the above description for the first centering plate 56a is applicable to the second centering plate 56b.

The first and second centering plates 56a and 56b are held in spaced parallel disposition relative to each other by fasteners, as described above, such that the tension strut 12 is reciprocally receivable therebetween. As thusly received, the first and second centering cams 36 and 38 of the tension strut 12 are also receivable within the forked first end 66 of the centering plates 56a and 56b, thereby limiting the deflections of the fuselage to a predetermined limit, as described in greater detail below.

Figure 5:
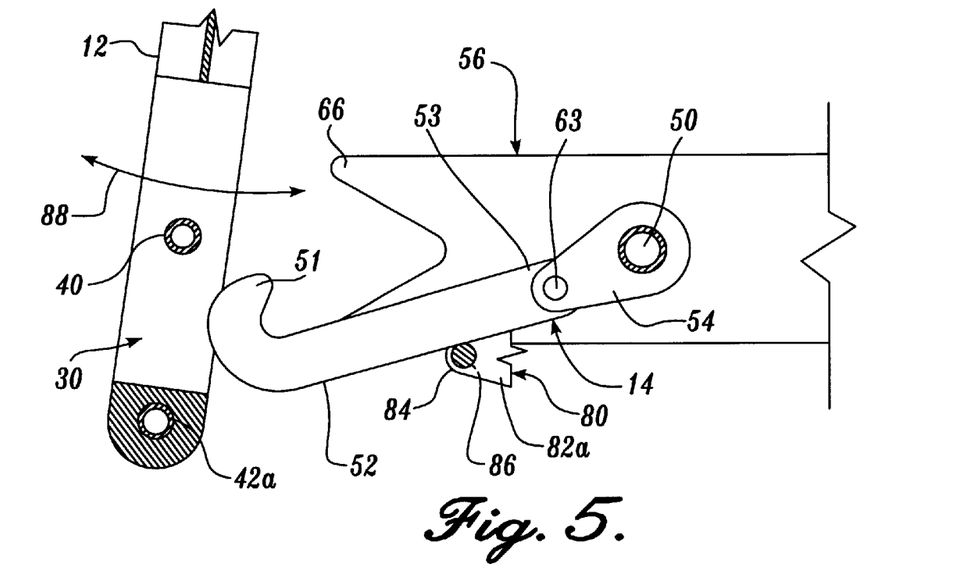
FIG. 5 is a cross-sectional side view of the movable tension tie assembly of the present invention taken along Section 5—5 of FIG. 4 and is shown in the partially open position with the tension tie shown partially in phantom.

FIG. 5 is a cross-sectional view of the strut 12 as it rotates toward the centering plate 56 and the lock assembly 14, wherein the lock assembly 14 further includes a guide assembly 80 for guiding and supporting the pull-in hook 52. The guide assembly 80 includes identical first and second flanges held in spaced disposition at a tapered first end 84 by a cylindrical roller 86. The roller 86 is suitably manufactured from a solid piece of high strength material and may be rotatably mounted between the first flange 82a and the second flange 82b (FIG. 3) on a pair of suitable shaft bearings, as is well known in the art. The guide assembly 80 is rigidly attached to the floor beams 39 at a second end (not shown) by a plurality of fasteners, such as bolts or rivets. The guide assembly 80 positions the roller 86 so that it is oriented parallel to the drive shaft 50. The guide assembly 80 is located between the first and second centering plates 56a and 56b, at a predetermined distance below and behind the open portion of the forked end 66 of the centering plates 56a and 56b. The width of the guide assembly 80 is sized such that it will fit within the opening 30 of the tension strut 12 when the tension tie assembly 10 is in the extended position, as seen in FIG. 3. The pull-in hook 52 is positioned relative to the opening 30 such that when the tension tie assembly 10 is actuated between the retracted and extended positions, the pull-in hook 52 freely travels through the opening 30. As configured, and when the lock assembly 14 is actuated between its locked and unlocked positions, the guide assembly 80 insures that the pull-in hook 52 will engage the hook pin 40 of the tension strut 12, to be described in greater detail below.

Figure 6:
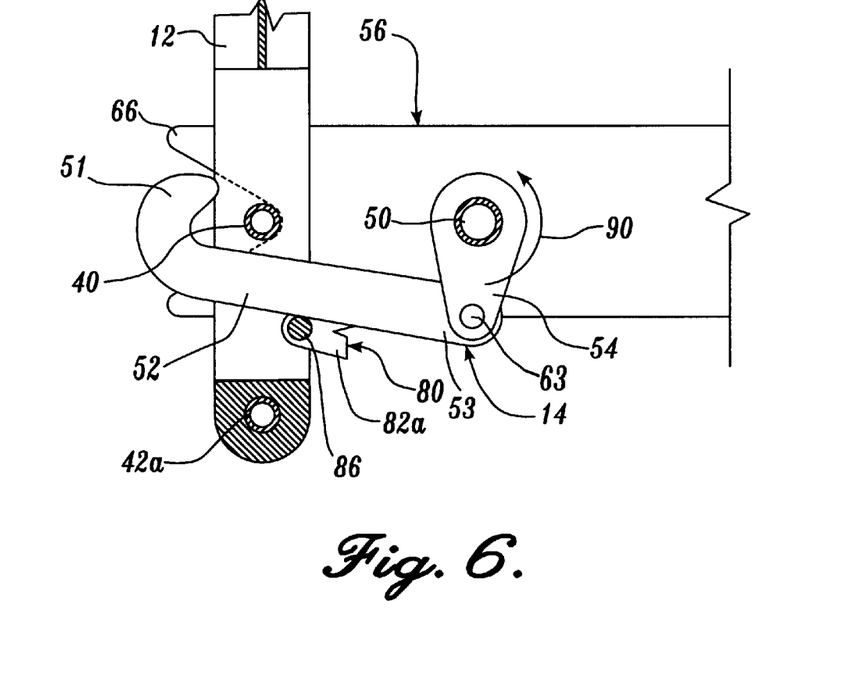
FIG. 6 is a cross-sectional side view of the movable tension tie assembly of the present invention taken along Section 5—5 of FIG. 4 and is shown in the partially unlocked position with the tension tie shown partially in phantom.

As briefly described above, the tension tie assembly 10 is actuatable between the retracted and extended positions by the lift drive motor 26 swinging the tension strut 12 in the direction as indicated by the arrow 88 in FIG. 5. After the tension strut 12 is actuated into the fully extended position as seen in FIG. 6, a position sensor, such as a limit switch, encoder, or another well known means in the art, begins the locking sequence by activating the drive motor 17. The drive motor 17 rotates the crank arm 54 in a counterclockwise direction about an axis of rotation defined by the length of the drive shaft 50 and as indicated by the arrow 90.

As the crank arm 54 rotates, it pulls the pull-in hook 52 along the roller 86 of the guide assembly 80. As the pull-in hook 52 is pulled by the crank arm 54, the roller 86 not only limits the downward displacement of the pull-in hook 52, but also defines its travel along a predetermined path, thereby ensuring proper locking engagement of the pull-in hook 52 with the hook pin 40. As the lock assembly 14 is actuated between its unlocked position, as seen in FIG. 5, and its partially locked position, as seen in FIG. 6, the interaction of the crank arm 54 and guide assembly 80 causes the pull-in hook 52 to travel along an arcuate path as it moves toward engagement with the hook pin 40 of the strut 12. The crank arm 54 and the roller 86, acting as a fulcrum, causes the second end 53 of the pull-in hook 52 to drop to a position that is substantially parallel with the roller 86, thereby pivoting the arcuate first end 51 upwardly towards the hook pin 40. Thus, the arcuate first end 51 of the pull-in hook 52 is now positioned for locking and centering engagement with the hook pin 40.

Figure 7:
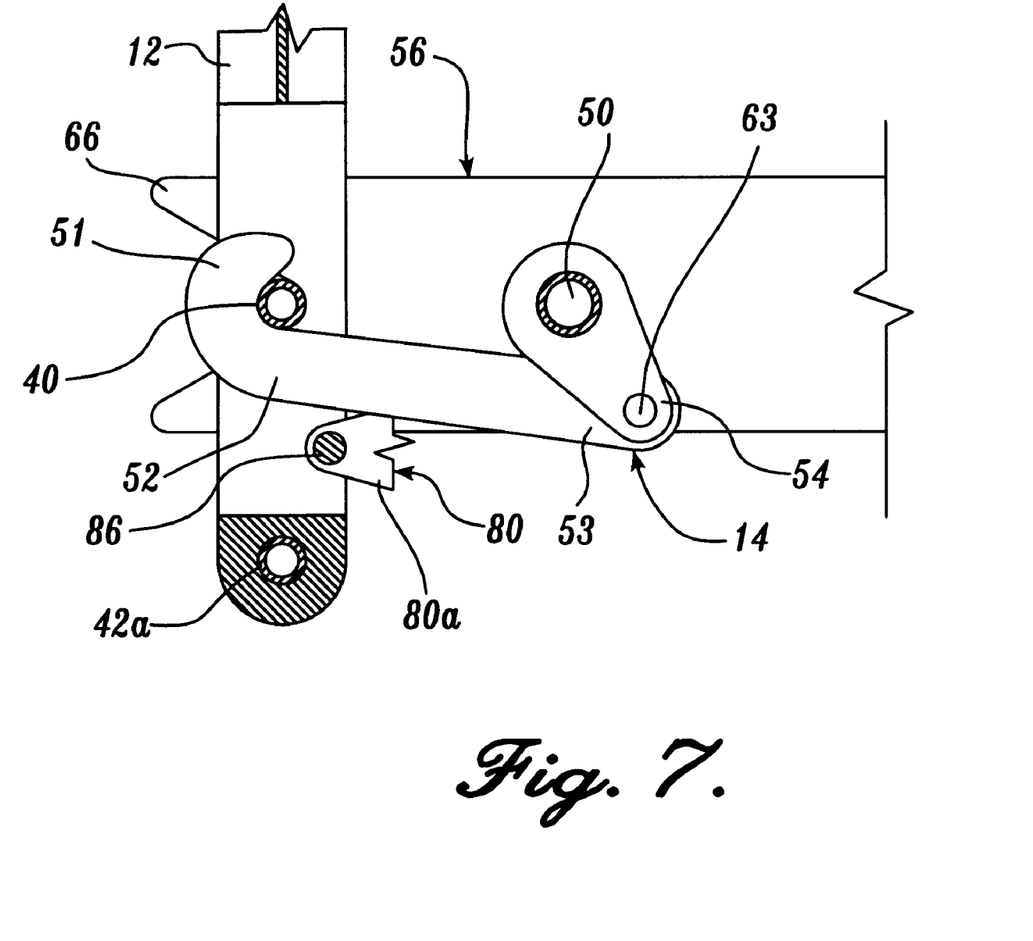
FIG. 7 is a cross-sectional side view of the movable tension tie assembly taken along Section 5—5 of FIG. 4 and is shown in the locked position with the tension tie shown partially in phantom.

Referring now to FIG. 7, the lock assembly 14 continues its locking sequence, whereby the crank arm 54 continues to rotate in a counterclockwise direction about the drive shaft 50. As the pull-in hook 52 continues to be pulled inwardly towards the strut 12 by the crank arm 54, the tip area of the arcuate first end 51 engages the hook pin 40. As the pull-in hook 54 continues toward its fully locked position, the hook pin 40 slides into the concave portion of the arcuate first end 51, thereby ensuring that the pull-in hook 52 is fully engaged with the hook pin 40. The crank arm 54 continues to drive the pull-in hook 52 against the tension strut 12 until a position sensor (not shown), such as a limit switch or encoder, indicates that the centering cams 36 and 38 of the tension strut 12 are firmly pinned and locked within the forked portion of the centering plates 56a and 56b.

The centering plates 56a and 56b also serve to minimize any deflections in the floor structure due to loading of cargo and/or passengers. As weight is added to the floor structure, the floor may deflect downwardly out of its neutral position. As described above, the first end 16 of the tension strut 12 is rigidly attached to structure that opposes the floor structure, such as ceiling structure. As the pull-in hook 52 draws the tension strut 12 into the fully locked position, the centering cams 36 and 38 thereof will be guided along the sloped portion of the centering plates 56a and 56b, thereby pulling the floor structure back into its neutral position. Thus, not only do the centering plates 56a and 56b assist in locking the tension struts 12 into position, they also assist in centering the floor structure back into its neutral position.

After the tension strut 12 is locked into the extended position by the lock assembly 14, as described above, a secondary latch and latch cam lock mechanism (not shown), well known in the art and similar to that currently used on Boeing 747 airplane cargo doors, is rotated into a locked position. The latch and latch cam lock mechanism mechanically restricts inadvertent movement of the tension strut 12 by bearing against the first and second secondary lock pins 42a and 42b. The unlocking sequence of the lock assembly 14 may be accomplished by reversing the steps outlined above for the locking sequence.

The above description has been in reference to the first tension strut 12a. The second tension strut 12b is constructed identical to the first tension strut 12a and operates in an identical manner as the first tension strut 12a. Therefore, the above description for the first tension strut 12a also applies to the second tension strut 12b.

The previously described version of the present invention has the advantage of providing a tension enhancing assembly to a noncircular pressure vessel without adding unreasonable amounts of material to conventional fuselage structure, such as the crown beam, keel beam, or frames. Additionally, the present invention's use of movable tension struts 12 permit the tension enhancing structure to be swung into a retracted position, wherein cargo may be easily loaded and unloaded from within the fuselage. Thus, the present invention provides a relatively simple and weight efficient assembly to react and transfer large loads resulting from pressurization of the interior of a fuselage having a double lobe cross section.

From the foregoing description, it can be seen that the movable tension tie assembly of the present invention incorporates many novel features and offers significant advantages over the prior art. It will be apparent to those of ordinary skill that the embodiment of the invention illustrated and described herein is exemplary only. Changes can be made to the foregoing embodiment while remaining within the spirit and scope of the present invention. As a non-limiting example, the tension struts 12 may be manually actuated between the retracted and extended positions without using an electromechanical drive unit as described above in the preferred embodiment. Thus, the illustrated and described embodiment is to be considered as exemplary only and various changes can be made without departing from the spirit and scope of the invention.

The embodiments of the invention in which an exclusive property or privilege is claimed are defined as follows:

1. A pressurized aircraft hull and a movable tension tie assembly, said hull having an interior, comprising:
   (a) a plurality of elongate struts having first and second ends; said first end swingingly connected to said interior of said hull for swinging movement of said struts between a retracted position wherein said struts do not obstruct said interior of said hull and an extended position wherein said struts extend substantially across said interior of said hull;
   (b) a plurality of centering latch members fixed to said interior and positioned for engagement with said second ends of said struts when said struts are in said extended position;
   (c) locking means connected to said interior of said hull for locking engagement with said struts, said locking means moving said struts in a lateral direction relative to an axis extending in the elongate direction of said struts; and
   (d) actuation means operatively connected to said locking means for selectively actuating said locking means between a locked position wherein said struts limit deflections of said hull when said hull is pressurized and an unlocked position wherein said struts may be swung into said retracted position.

2. The pressurized aircraft hull and movable tension tie assembly of claim 1, wherein said centering latch members are a plurality of forked plates that are positioned for locking engagement with said second ends of said struts.

3. The pressurized aircraft hull and movable tension tie assembly of claim 2, wherein said second ends of said struts comprise first and second centering cams protruding outwardly from opposing sides of said second ends of each strut and are positionable within said forked portion of said forked plates to limit the deflections of said pressure hull.

4. The pressurized aircraft hull and movable tension tie assembly of claim 1 further comprising an electromechanical unit disposed adjacent to said first ends of said struts and operatively connected thereto to actuate said struts between said retracted and said extended positions.

5. The pressurized aircraft hull and movable tension tie assembly of claim 4, wherein said electromechanical drive unit is a motor.

6. The pressurized aircraft hull and movable tension tie assembly of claim 1, wherein said locking means comprises a pull-in hook operatively disposed to said actuation means and positioned for hooking engagement with said second end of each strut such that said struts are selectively coupled to said pressure hull when said locking means are in said locked position.

7. The pressurized aircraft hull and movable tension tie assembly of claim 1, wherein said actuation means is an electromechanical drive unit.

8. The pressurized aircraft hull and movable tension tie assembly of claim 7, wherein said actuation means is a motor.

9. A pressurized aircraft hull and a movable tension tie assembly, said hull having an interior, comprising:
   (a) a plurality of elongate struts having first and second ends; said first end swingingly connected to said interior of said hull for swinging movement of said struts between a retracted position wherein said struts do not obstruct said interior of said hull and an extended position wherein said struts extend substantially across said interior of said hull;
   (b) a motor disposed adjacent to said first ends of said struts and operatively connected thereto to actuate said struts between said retracted and said extended positions;
   (c) a plurality of centering latch members fixed to said interior and positioned for engagement with said second ends of said struts when said struts are in said extended position;
   (d) a locking assembly mounted to said interior of said hull and positioned for locking engagement with said second end of said struts when said struts are in said extended position, said locking assembly moving said struts in a lateral direction relative to an axis extending in the elongate direction of said struts; and
   (e) actuation means operatively connected to said locking assembly for selectively actuating said locking assembly between a locked position wherein said struts limit deflections of said hull when said hull is pressurized and an unlocked position.

10. A pressurized aircraft hull and a movable tension tie assembly, said hull having a double lobe cross section, an upper cabin separated from a lower cabin by a central floor, an elongate crown beam disposed along the longitudinal centerline defined at the top of said fuselage, and a keel beam disposed along the longitudinal centerline defined at the bottom of said fuselage, comprising:
   (a) a first elongate strut assembly vertically disposed at the longitudinal centerline of said upper cabin, wherein said first strut assembly further comprising:
      (i) a plurality of elongate struts each having first and second ends spaced in the elongate direction from each other, said first ends of said struts swingingly connected to said crown beam for swinging movement of said struts between a retracted position wherein said struts do not obstruct said interior of said upper cabin and an extended position wherein said struts extend substantially across the interior of said upper cabin;
      (ii) a motor operatively coupled between said first ends of said struts to selectively actuate said struts between said retracted and extended positions;
      (iii) a plurality of centering latch members fixed to said central floor and positioned for engagement with said second ends of said struts when said struts are in said extended position;
      (iv) a lock assembly fastened to said central floor and positioned for locking engagement with said second end of said struts when said struts are in said extended position, said lock assembly moving said struts in a lateral direction relative to an axis extending in the elongate direction of said struts; and (v) actuation means operatively connected to said locking assembly for selectively actuating said locking assembly between a locked position wherein said struts limit deflections of said fuselage when said fuselage is pressurized and an unlocked position;

(b) a second elongate strut assembly vertically disposed at the longitudinal centerline of said lower cabin, wherein said second strut assembly further comprising:

(i) a plurality of elongate struts each having first and second ends spaced in the elongate direction from each other, said first ends of said struts swingingly connected to said central floor for swinging movement of said struts between a retracted position wherein said struts do not obstruct said interior of said lower cabin and an extended position wherein said struts extend substantially across the diameter of said lower cabin;

(ii) a motor operatively coupled between said first ends of said struts to selectively actuate said struts between said retracted and extended positions;

(iii) a plurality of centering latch members fixed to said keel beam and positioned for engagement with said second ends of said struts when said struts are in said extended position;

(iv) a lock assembly fastened to said keel beam and positioned for locking engagement with said second end of said struts when said struts are in said extended position, said lock assembly moving said struts in a lateral direction relative to an axis extending in the elongate direction of said struts; and (v) actuation means operatively connected to said locking assembly for selectively actuating said locking assembly between a locked position wherein said struts limit deflections of said fuselage when said fuselage is pressurized and an unlocked position.

* * * * *

UNITED STATES PATENT AND TRADEMARK OFFICE
CERTIFICATE OF CORRECTION

PATENT NO. : 5,921,593
DATED : July 13, 1999
INVENTOR(S) : H. Gassert

It is certified that error appears in the above-identified patent and that said Letters Patent is hereby corrected as shown below:

On the title page, item

| | | | | |
|---|---|---|---|---|
| [56] Pg. 1, col. 1 | Refs. Cited (U.S. Patents) | Please insert the following references: | | |
| | | --1,992,941 | 3/1935 | Fowler |
| | | 2,697,569 | 12/1954 | Westcott, Jr. |
| | | 3,481,567 | 12/1969 | Stearman |
| | | 4,318,561 | 3/1982 | Hasquenoph et al. 294/83 |
| | | 4,395,000 | 7/1983 | Deviny et al . . . . 244/118.3 |
| | | 4,538,843 | 9/1985 | Harris . . . . . . . . 292/113 |
| | | 5,086,996 | 2/1992 | Roeder et al. . . . 244/119 |
| | | 5,137,232 | 8/1992 | Bright . . . . . . . . 244/121 |
| | | 5,284,378 | 2/1994 | Sautter et al. . . . 296/224 |
| | | 5,413,390 | 5/1995 | Filippi . . . . . . . 292/96 |
| | | 5,595,407 | 1/1997 | ter Horst et al. . . 292/5 |
| | | 5,678,881 | 10/1997 | Tokarz . . . . . . . . 296/121 |
| Pg. 1, col. 2 | Attorney, Agent, or Firm | "PLLC" should be in superscript | | |

Signed and Sealed this

Fifteenth Day of February, 2000

Attest:

Q. TODD DICKINSON

*Attesting Officer*        *Commissioner of Patents and Trademarks*